(No Model.) 2 Sheets—Sheet 1.
J. H. ALLYN.
CHECK ROW CORN PLANTER.
No. 271,676. Patented Feb. 6, 1883.
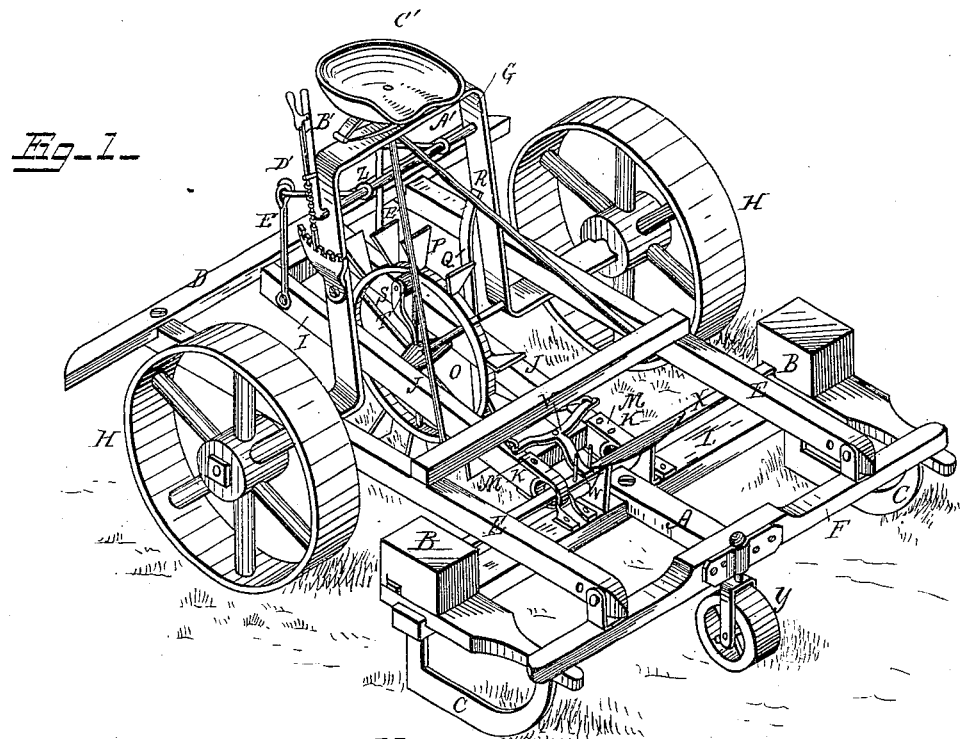
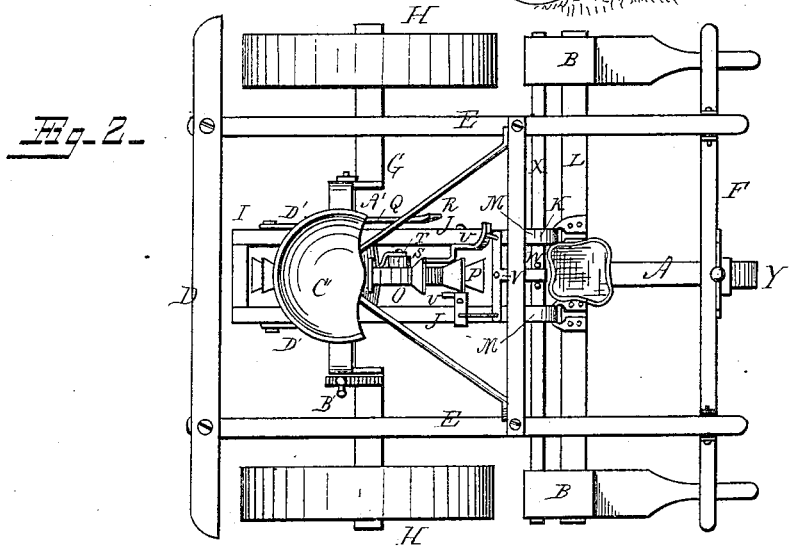
WITNESSES
F. L. Ouraud
J. R. Littell
INVENTOR
John H. Allyn,
by C. A. Snow & Co.
Attorneys (No Model.) 2 Sheets—Sheet 2.

J. H. ALLYN.
CHECK ROW CORN PLANTER.

No. 271,676. Patented Feb. 6, 1883.

WITNESSES

INVENTOR

UNITED STATES PATENT OFFICE.

JOHN H. ALLYN, OF REDDING, IOWA.

CHECK-ROW CORN-PLANTER.

SPECIFICATION forming part of Letters Patent No. 271,676, dated February 6, 1883.

Application filed August 18, 1882. (No model.)

*To all whom it may concern:*

Be it known that I, JOHN H. ALLYN, of Redding, in the county of Ringgold and State of Iowa, have invented certain new and useful Improvements in Check-Row Corn-Planters; and I do hereby declare that the following is a full, clear, and exact description of the invention, which will enable others skilled in the art to which it appertains to make and use the same, reference being had to the accompanying drawings, which form a part of this specification.

Figure 3:
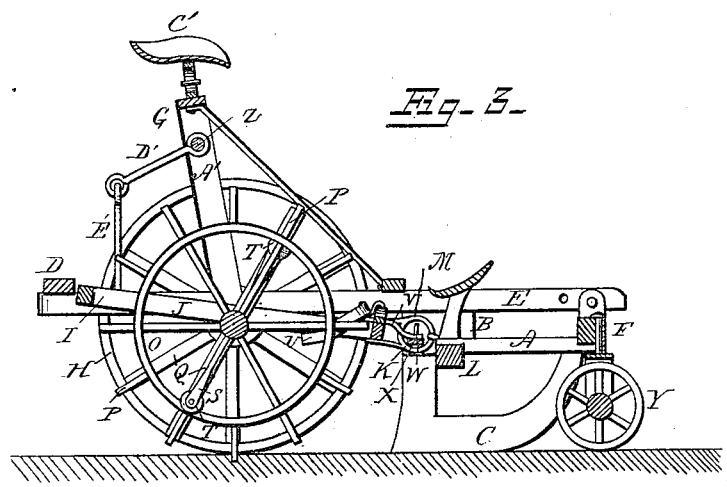
Figure 4:
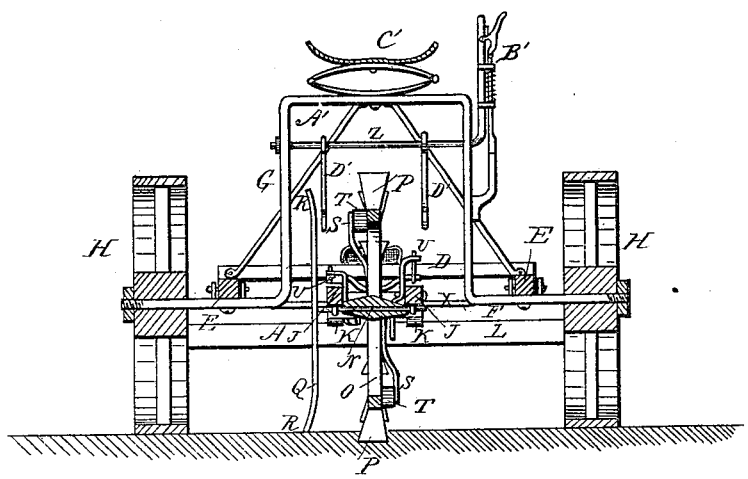

Figure 1 is a perspective view of my improved corn-planter. Fig. 2 is a top view. Fig. 3 is a longitudinal vertical sectional view, and Fig. 4 is a vertical cross-section.

Corresponding parts in the several figures are denoted by like letters of reference.

This invention relates to check-row corn-planters; and it consists in certain improvements in the construction of the same, which will be hereinafter fully described, and particularly pointed out in the claims.

In the drawings hereto annexed, A represents a frame carrying the seed-boxes B B, and supported upon the colters or furrow-openers C C.

D is a frame, the side beams of which, E, are hinged to the front cross-bar, F, of frame A. Said frame D, which extends in rear of frame A, and which may be termed the "main frame" of the machine, carries the arched axle G, having the transporting-wheels H.

I is a third auxiliary frame, the sides of which, J, are provided at their front ends with eyes or openings K, by which the said frame is hinged to the rear cross-bar, L, of the frame A by means of straps or clevises M of suitable construction. The frame I has bearings for a transverse shaft, N, carrying the driving-wheel O, which is provided at its rim with sharp blades P. Shaft N also carries the marker Q, which is simply a cross-bar suitably secured upon the shaft, and having heads or ends R. The drive-wheel O is provided at its rim with brackets S, carrying rollers T, the axles of which are parallel to that of wheel O. The rollers T serve to actuate levers U, pivoted to the sides of frame I, and actuating in turn a T-lever, V, pivoted upon a cross-bar of frame I, to the arms of which the levers U are suitably connected. The front arm of lever V rests between two pins, W, upon (or, if preferred, in a suitable slot in) the seed-slide X, which slides transversely in the eyes or bearings K, and which serves to operate the seed-dropping mechanism.

The front cross-bar of frame A has a central swiveled caster-wheel, Y, serving to support said frame, and also to pack the ground in front of the drive-wheel, which is thereby caused always to take a firm hold in the ground.

Z is a shaft journaled transversely in the arch A' of the axle, and having an operating-lever, B', the handle of which is within reach of the driver, whose seat C' is mounted upon the arch of the axle. Shaft Z has a pair of arms, D', connected by pivoted rods E' with the rear end of the frame I. Suitable mechanism may be employed to retain the operating-lever B' in any position to which it may be adjusted.

The operation of my invention will be readily understood. To throw the seed-dropping mechanism out of gear it is only necessary to raise the frame I so as to lift the driving-wheel from the ground. Said frame I, as will be noticed, is entirely independent of the transporting-frame, and in any position of the latter, as well as in any relative position of the frames A and I, the seed-dropping mechanism is capable of operating freely, the seed-slide moving, as described, in the same bearings which serve to connect or hinge the frames A and I together.

Having thus described my invention, I claim and desire to secure by Letters Patent of the United States—

1. The combination of the seeder-frame A with the transporting-frame D, hinged to the front cross-bar of the seeder-frame A, and the auxiliary frame I, hinged to the rear cross-bar of said frame A, as set forth.

2. The combination of the frame A, having swiveled caster-wheel Y, with the transporting-frame D, hinged to the front cross-bar of the seeder-frame, and the auxiliary frame I, having drive-wheel O, said frame I being hinged to the rear cross-bar of the frame A, as set forth.

3. The combination of the frame A, hinged frame D, hinged frame I, having bearings K, seed-slide X, mounted in said bearings, drive-wheel O, and suitable operating mechanism, all substantially as set forth.

4. The combination, with the frame A, of the hinged frame I, having eyes or bearings K, the seed-slide X, mounted in said eyes, the drive-wheel O, having blades P, and brackets S, provided with rollers T, the levers U, and T-lever V, all arranged and operating substantially as set forth.

5. The combination of the frame A, hinged frame D, having arched axle G, the hinged frame I, the shaft Z, journaled in the arch A' of axle G, and having lever B' and arms D', and the connecting-rods E', as and for the purpose set forth.

In testimony that I claim the foregoing as my own I have hereunto affixed my signature in presence of two witnesses.

JOHN H. ALLYN.

Witnesses:
N. L. COLLAMER,
C. K. ALLEN.